(12) United States Patent
Mörschner et al.

(10) Patent No.: US 10,294,043 B2
(45) Date of Patent: May 21, 2019

(54) SCREW DENESTER WITH TRIGGER PLATE

(71) Applicant: MULTIVAC Sepp Haggenmüller SE & Co. KG, Wolfertschwenden (DE)

(72) Inventors: Lars Mörschner, Lauben (DE); Bernhard Fickler, Hawangen (DE)

(73) Assignee: Multivac Sepp Haggenmüller SE & Co. KG, Wolfertschwenden (DE)

(*) Notice: Subject to any disclaimer, the term of this patent is extended or adjusted under 35 U.S.C. 154(b) by 0 days.

(21) Appl. No.: 15/901,797

(22) Filed: Feb. 21, 2018

(65) Prior Publication Data

US 2018/0237233 A1 Aug. 23, 2018

(30) Foreign Application Priority Data

Feb. 23, 2017 (EP) ..................................... 17157566

(51) Int. Cl.
| | | |
|---|---|---|
| *B65G 59/10* | (2006.01) | |
| *B65B 43/44* | (2006.01) | |
| *B65G 59/06* | (2006.01) | |
| *B65G 43/00* | (2006.01) | |

(52) U.S. Cl.
CPC ............ *B65G 59/108* (2013.01); *B65B 43/44* (2013.01); *B65G 43/00* (2013.01); *B65G 59/066* (2013.01); *B65G 2201/0258* (2013.01); *B65G 2207/40* (2013.01)

(58) Field of Classification Search
CPC .... B65G 59/108; B65G 43/00; B65G 59/066; B65G 2201/0258; B65G 2207/40; B65B 43/44

USPC ............... 221/222, 36, 223, 6, 197; 414/331
See application file for complete search history.

(56) References Cited

U.S. PATENT DOCUMENTS

| | | | | |
|---|---|---|---|---|
| 2,149,099 | A | * | 2/1939 | Phinney .................... A47F 1/10 221/14 |
| 3,840,150 | A | | 10/1974 | Kinney |
| 3,862,702 | A | * | 1/1975 | Johnson ............... B65G 59/108 221/1 |
| 4,120,662 | A | * | 10/1978 | Fosslien ................. G01N 35/04 422/561 |
| 4,288,003 | A | * | 9/1981 | Fries, Jr. ............. B65G 59/108 221/1 |
| 4,961,684 | A | * | 10/1990 | Proven ................. B65G 59/108 221/222 |
| 5,064,093 | A | * | 11/1991 | Davis ................... B65G 59/108 221/222 |
| 6,098,379 | A | * | 8/2000 | Spatafora ................ B65B 35/04 414/788.9 |

(Continued)

FOREIGN PATENT DOCUMENTS

| | | | | |
|---|---|---|---|---|
| DE | 202014008161 U1 | * | 2/2015 | .......... B65G 59/108 |
| DE | 202014008161 U1 | | 3/2015 | |

(Continued)

*Primary Examiner* — Rakesh Kumar
(74) *Attorney, Agent, or Firm* — Husch Blackwell LLP

(57) ABSTRACT

A screw denester for isolated dispensing of trays, comprising a frame for arrangement on a motor-driven transport device and multiple force-driven dispensing screws for isolating and dropping of trays. The screw denester is characterized in that it has a trigger plate that is provided loosely on the frame below the dispensing screws, wherein at least one sensor is provided that records a position change of the trigger plate in relation to the frame.

12 Claims, 5 Drawing Sheets

(56) References Cited

U.S. PATENT DOCUMENTS

| | | | | |
|---|---|---|---|---|
| 7,731,899 | B2 * | 6/2010 | Talmer | G01N 35/00029 |
| | | | | 422/63 |
| 8,480,954 | B2 * | 7/2013 | Talmer | G01N 35/00029 |
| | | | | 422/63 |
| 2010/0196202 | A1 | 8/2010 | Talmer et al. | |
| 2011/0296693 | A1 * | 12/2011 | Oakes | A47G 21/06 |
| | | | | 30/142 |
| 2012/0080444 | A1 * | 4/2012 | Smith | A47F 1/10 |
| | | | | 221/208 |
| 2012/0145734 | A1 * | 6/2012 | Walters | A47F 1/10 |
| | | | | 221/1 |

FOREIGN PATENT DOCUMENTS

| | | | | |
|---|---|---|---|---|
| EP | 2186760 A1 * | 5/2010 | | B65G 59/108 |
| EP | 2186760 A1 | 5/2010 | | |
| EP | 2712815 A1 * | 4/2014 | | B65B 43/46 |
| EP | 2712815 A1 | 4/2014 | | |
| EP | 3366616 A1 * | 8/2018 | | B65G 59/108 |
| GB | 2258651 A * | 2/1993 | | B65G 59/102 |

* cited by examiner

SCREW DENESTER WITH TRIGGER PLATE

CROSS-REFERENCE TO RELATED APPLICATIONS

This application claims priority to European Patent Application No. 17 157 566.5, filed on Feb. 23, 2017, to Lars Mörschner and Bernhard Fickler, currently pending, the entire disclosure of which is incorporated herein by reference.

FIELD OF THE INVENTION

The invention relates to a screw denester for dispensing of individual trays with a trigger plate.

BACKGROUND OF THE INVENTION

From EP 2 712 815 A1, a packaging facility is known that comprises a tray sealing machine, a tappet feeder and a dispensing unit that is also called denester. The denester drops individual trays onto the tappet feeder. The tappet feeder, in turn, has a circulating, motor-driven chain drive with a plurality of tappets, wherein each tray is pushed by respectively one tappet from the denester to the tray-sealing machine.

Multiple solutions are conceivable to avoid any shearing and squeezing risk during manual access by an operating person. A variant consists of a mechanical housing of the denester or a curtain of light around the denester in order to avoid access during running operation, especially of the tappet feeder. A further conceivable variant is an embodiment of the denester in which a vertical minimum distance of 100 mm is provided between the upper edge of the tappet of the tappet feeder and the lower edge of the dispensing screws of the denester. Due to the high safety distance, there is no shearing or squeezing risk even when no housing exists. This is disadvantageous because the trays are thrown down and/or dropped from this altitude of approximately 120 mm. The lower the height of the tray, the more critical is this altitude and the process safety is compromised because the rotary orientation of the empty tray can be changed after said empty tray hits the tappet feeder or because the tray can come to rest not within but on a lateral guiding. Likewise, it might occur that the empty tray gets caught with its tray edge on the tappet itself due to the impact. Such situations can lead to problems in a successive automated filling process, just as during handover of the trays from the tappet feeder to the tray-sealing machine.

SUMMARY OF THE INVENTION

The object of the invention is to provide an improved embodiment of the combination of a screw denester with a motor-driven transport device.

The screw denester according to the invention for isolated dispensing of trays comprises a frame for arrangement on an in particular motor-driven, horizontally conveying transport device and multiple force-driven dispensing screws for isolating and dropping of trays, usually plastic packaging trays. The screw denester is characterized in that it has a trigger plate that may be disposed loosely on the frame below the dispensing screws, wherein at least one sensor may be provided that records a position change of the trigger plate in relation to the frame. This allows that the usually required safety distance of at least 100 mm between the dispensing screws and force-driven tappets or a belt of the transport device can be underscored to avoid any shearing or squeezing point for a hand of an operator, because in case of squeezing of the hand of the operator by the tappet against the trigger plate, the trigger plate may be moved away from its production position and the drive of the transport device may be stopped as a consequence. Hence, any injury may be prevented and a dispensing unit with the dispensing screws can be set to a minimum distance to the transport device in order to minimize the height of fall of the tray after dropping by the dispensing screws and thereby to increase process safety in many ways. For example, rebound of the empty tray on the tappet guiding may be avoided and hence the desired position of the tray may be maintained.

The transport device may be used for transporting of trays in a usually horizontal direction. It can be configured for example in the form of a tappet feeder as in the EP 2 712 815 A1. Alternatively, the transport device could have a transport belt or a transport strap. The screw denester according to the invention may be particularly suitable for use on a transport belt whose friction is so high that a hand of an operator, which is laid and at most slightly pressed onto the belt, is dragged along during movement of the belt as this would for example be the case in silicone-coated belts.

The term "loose" in the sense of the invention shall be understood in such a way that the trigger plate is already deflected from its position by a (horizontal) force with a value <150N, e.g. that fits tightly to the frame only due to its tare weight. "Arranging" in the context of the invention means that the frame of the screw denester is mounted directly on the transport device or rather stands on its own pedestals on the floor so that the dispensing unit is also disposed above the transport device and that a height adjustment can be implemented via the pedestals.

The trigger plate may preferably have at least one opening for a tray in order to let the trays fall through the trigger plate. At the same time, access from below to the rotating dispensing screws may be prevented. The opening can thereby have a form that may be congruent to the outer dimensions of the tray.

Preferably, a first distance of the trigger plate to the bottom side of the dispensing screws may be less than 10 mm, preferably less than 3 mm, in order to minimize the distance of the dispensing screws to a transport bracket of the tappet feeder to achieve a low height of fall of the tray.

In a particularly preferred embodiment, a second distance of the trigger plate to the transport device may be vertically adjustable to be able to react to differently high trays and to set respectively a minimum height of fall of the tray.

In this context, the second distance can preferably be set by means of the position of the frame in relation to the transport device.

The trigger plate preferably has positioning elements, for example in form of conical recesses that interact with the frame, for example in conical troughs of intake holders which, in turn, are part of the frame. Therefore, the trigger plate may be centered in a loosely fitting way in the production position only by its net weight and can at the same time already be deflected from this position with a low force impact.

The at least one sensor may be connected preferably indirectly with a control for the drive of the transport device in order to stop the drive of the transport device in the fastest possible way during deflection of the trigger plate and/or in case of a signal of the sensor in order to avoid for example injury of the hand of the operator.

Recesses in the trigger plate and troughs of intake holders may preferably have a respective form that is nearly congruent to one another in order to create a centering effect of the trigger plate on the frame.

In addition to or instead of recesses, other positioning elements can also be used to position the trigger plate in relation to the intake holders. It would for example be conceivable to use magnets, preferably with a relatively weak magnetic force.

In the interest of a particularly reliable detection of a deflection of the trigger plate out of its resting position it would be advantageous to provide at least two sensors, preferably sensors that record opposite corner areas of the trigger plate. For this purpose, not only magnet sensors are an option. Rather, the sensor could also be configured in form of a light barrier or as a capacitive or inductive sensor. With capacitive or inductive position sensors, in particular the position of a metallic trigger plate could be retrieved and monitored.

In one aspect, the invention relates to the screw denester as such and in another aspect to the combination of a screw denester with a transport device for trays.

Other aspects and advantages of the present invention will be apparent from the following detailed description of the preferred embodiments and the accompanying drawing figures.

DESCRIPTION OF THE SEVERAL VIEWS OF THE DRAWING

In the following, an advantageous embodiment of the invention is illustrated in greater detail by means of drawings. The figures show.

DETAILED DESCRIPTION OF THE INVENTION

Figure 1:
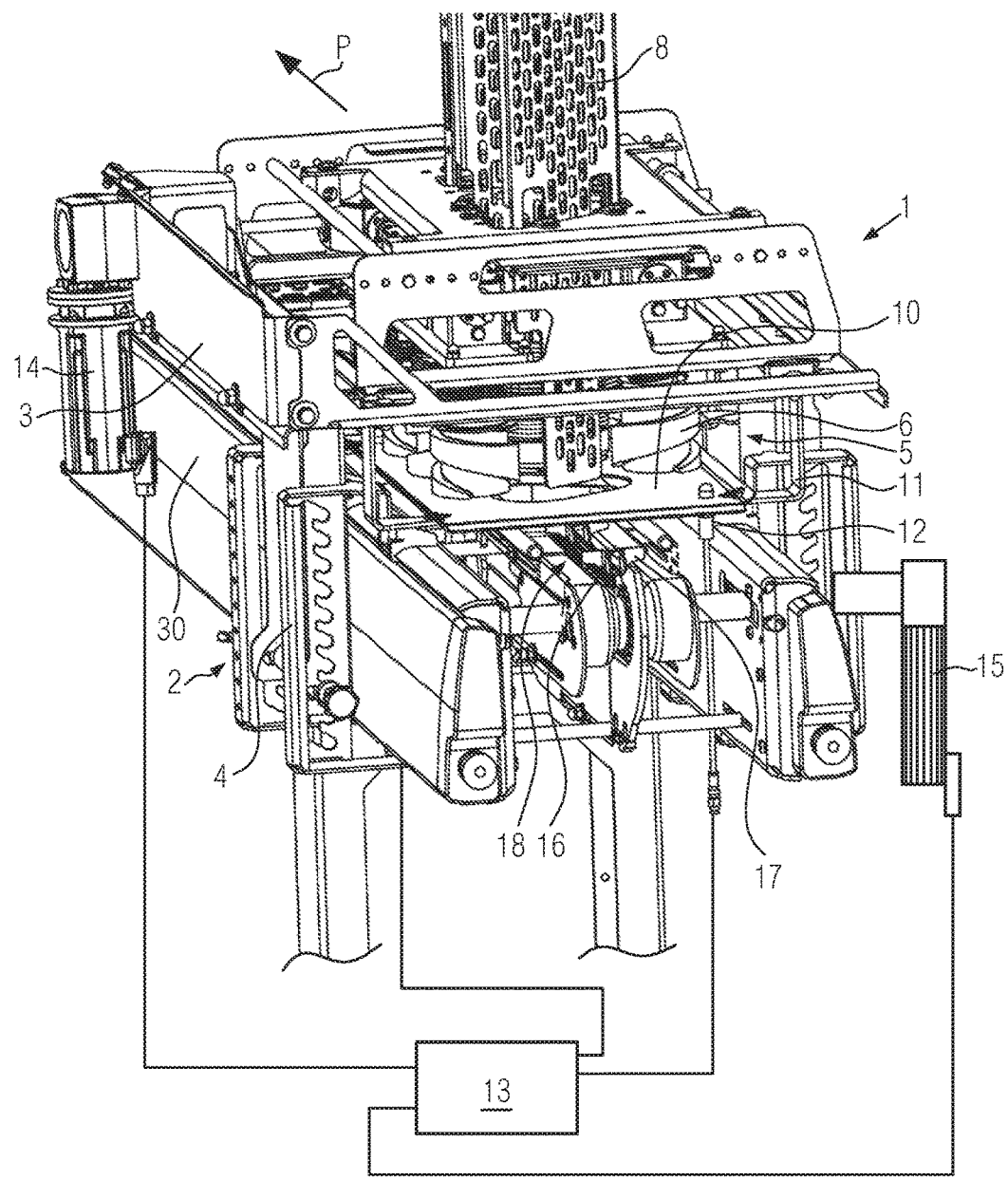
FIG. 1 is a front perspective view of one embodiment of a screw denester on a transport device in accordance with the teachings of the present disclosure.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

FIG. 1 shows a screw denester 1 according to the invention and a transport device 2 (in one embodiment, the transport device 2 may be a tappet guiding, but other transport devices, such as a belt may also be used and are within the scope of the present invention). In this context, the screw denester 1 can respectively be installed laterally on a frame 30 of the transport device 2 and adjustable steplessly or vertically in steps by means of an adjustment device 4. Also an embodiment, in which the screw denester 1 comprises preferably four pedestals by means of which the screw denester 1 stands on the floor and in which a dispensing unit 5 is located directly above the transport device 2 for dispensing the trays 9, in this case onto a tappet guiding 2, is conceivable.

The screw denester 1 according to the invention comprises a dispensing unit 5 with several dispensing screws 6 for isolation of trays 9 from a tray stack 7 (see FIG. 2) that is guided in guidings 8. The screw denester 1 comprises a trigger plate 10 that is arranged loosely on a frame 3 of the screw denester 1 by means of four intake holders 11, i.e. the trigger plate 10 only lies on the intake holders 11 in an essentially horizontally aligned way and adopts a production position in the process. Two of the four intake holders 11 have respectively one sensor 12 that monitors the position of the trigger plate 10 on the intake holders 11. The sensors 12 are connected to a control 13. The control 13 can be for example the control of the screw denester 1, of the tappet guiding 2 or of a tray sealing machine that follows the transport device 2 in the production direction P. Also a first motor 14 for the drive of the dispensing screws 6 and a second motor 15 for the drive of a tappet chain 16, on which there is a plurality of tappets 17 preferably at a regular distance to one another, are connected to the control 13.

The control 13 is intended to stop the second motor 15 and preferably also the first motor 14 at the same time in case of a trigger signal from at least one of the two sensors 12 in order to avoid any shearing or squeezing injury of a hand of an operator in case said operator reaches intentionally or also unintentionally into a gap 18 between the tappet chain 16 and/or the tappets 17 and the trigger plate 10 in the process of which the hand or a part of the hand is pressed against the trigger plate 10 by a tappet 17 that is moved in the production direction P. In this process, the trigger plate 10 is moved out of its production position. Depending on the position change of the trigger plate 10, this change is detected by one or both sensors 12 and consequently a fast stop of the second engine 15 is performed by the control 13 as a consequence so that the tappet chain 16 is stopped, preferably within a follow-up movement of less than 10 mm. This way, any hand injury is prevented.

Figure 2:
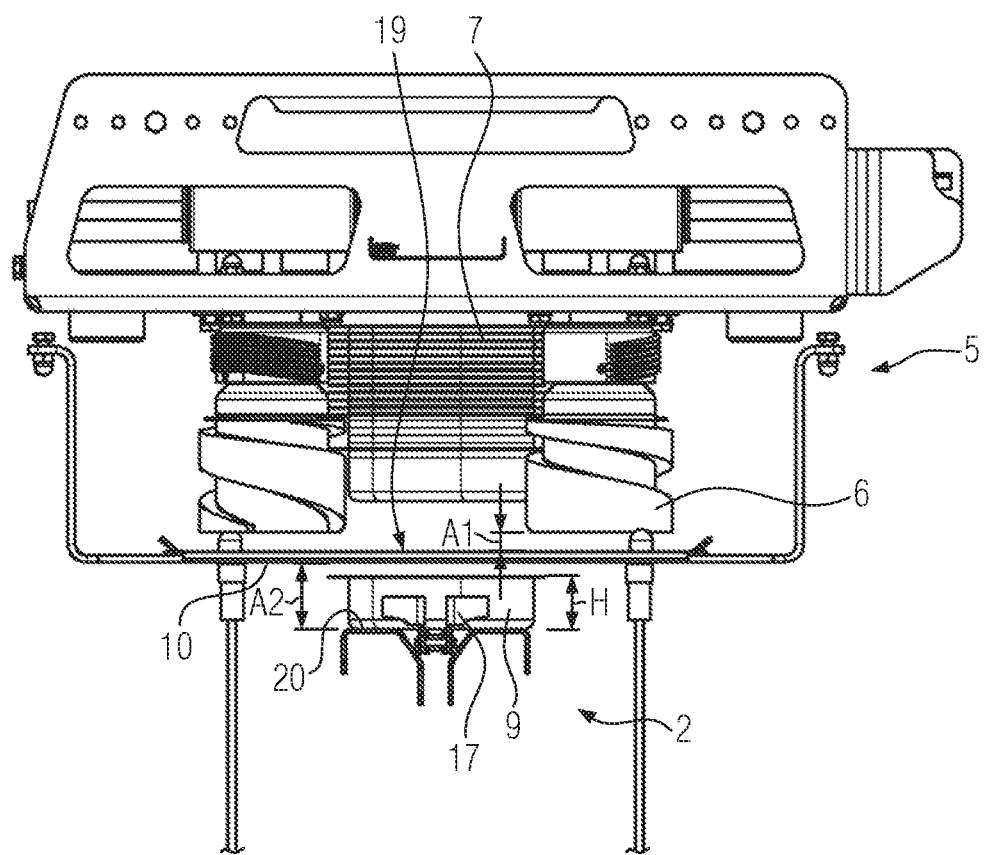
FIG. 2 is a partial section view of one embodiment of a screw denester and a tappet guiding in the production direction in accordance with the teachings of the present disclosure.

FIG. 2 shows a section view in the production direction P in which it can be seen clearly that the dispensing screws 6 of the dispensing unit 5 extend vertically downwards up to a first distance A1 of just a few millimeters to the trigger plate 10. The trigger plate 10 has 7 openings, see also FIG. 3, in accordance with the number of the tray stacks to be processed, through which the trays 9 fall onto a transport bracket 20 of the tappet guiding 2. Subsequently, the trays 9 are fed for example into a filling device and further into a tray-sealing machine, respectively by a tappet 17 in the production direction P. The height of the screw denester 1 is preferably set in a way that a second distance A2 of the trigger plate 10 to the transport bracket 20 is slightly larger than a tray height H, preferably by 5 mm to 10 mm larger.

This way, the height over which the tray 9 falls freely can be reduced to a minimum whereby the tray 9 hits the transport bracket 20 safely and accurately in terms of its position.

Figure 3:
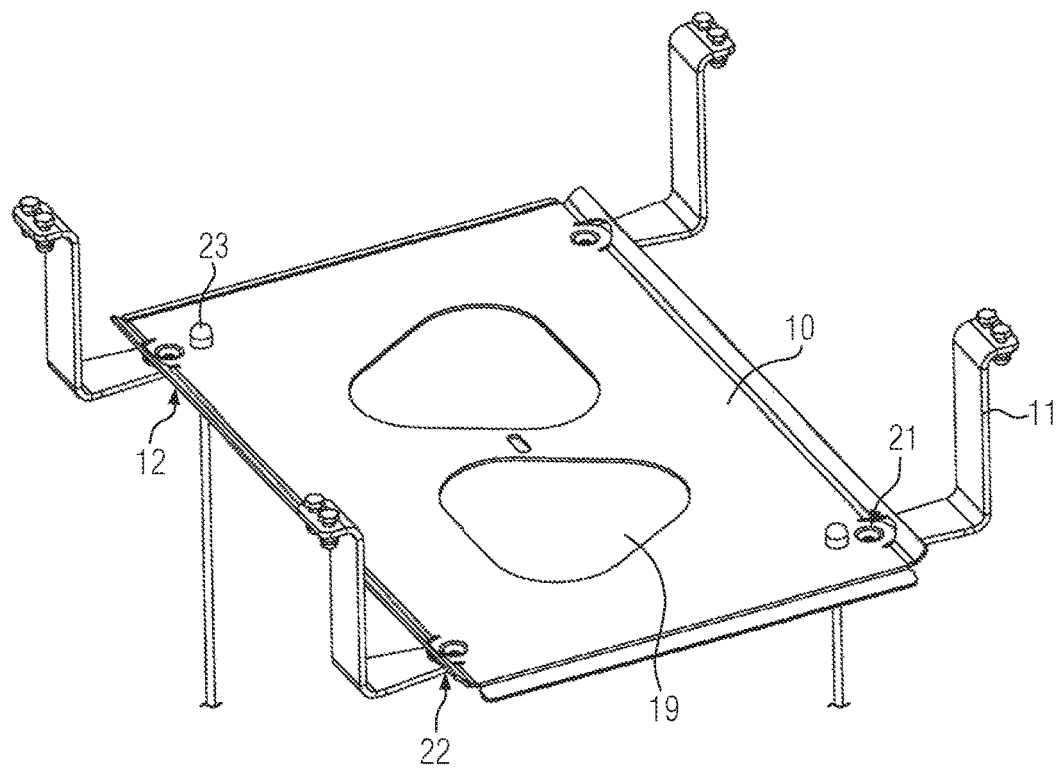
FIG. 3 is a top perspective view of one embodiment of a trigger plate showing intake holders in the production position in accordance with the teachings of the present disclosure.

FIG. 3 shows the trigger plate 10 with four intake holders 11 as a partial section. Here, the trigger plate 10 has two exemplary openings 19 that correlate with the outer contour of the trays 9. Furthermore, the trigger plate 10 has four recesses 21, which are formed in a downward direction, as positioning elements that interact with troughs 22, as shown in greater detail in FIG. 5, of the intake holders 11 in such a way that the position of all recesses 21 in the troughs 22 determine the production position. Two magnets 23, which are for example located opposite to one another in the trigger plate 10, as shown in greater detail in FIG. 5, interact with the sensors 12, which are provided on two opposite intake holders 11, in such a way that a start of the transport device 2 is only approved by means of the control 3 when both sensors 12 respectively record the magnet 23 that is assigned to them.

Figure 4:
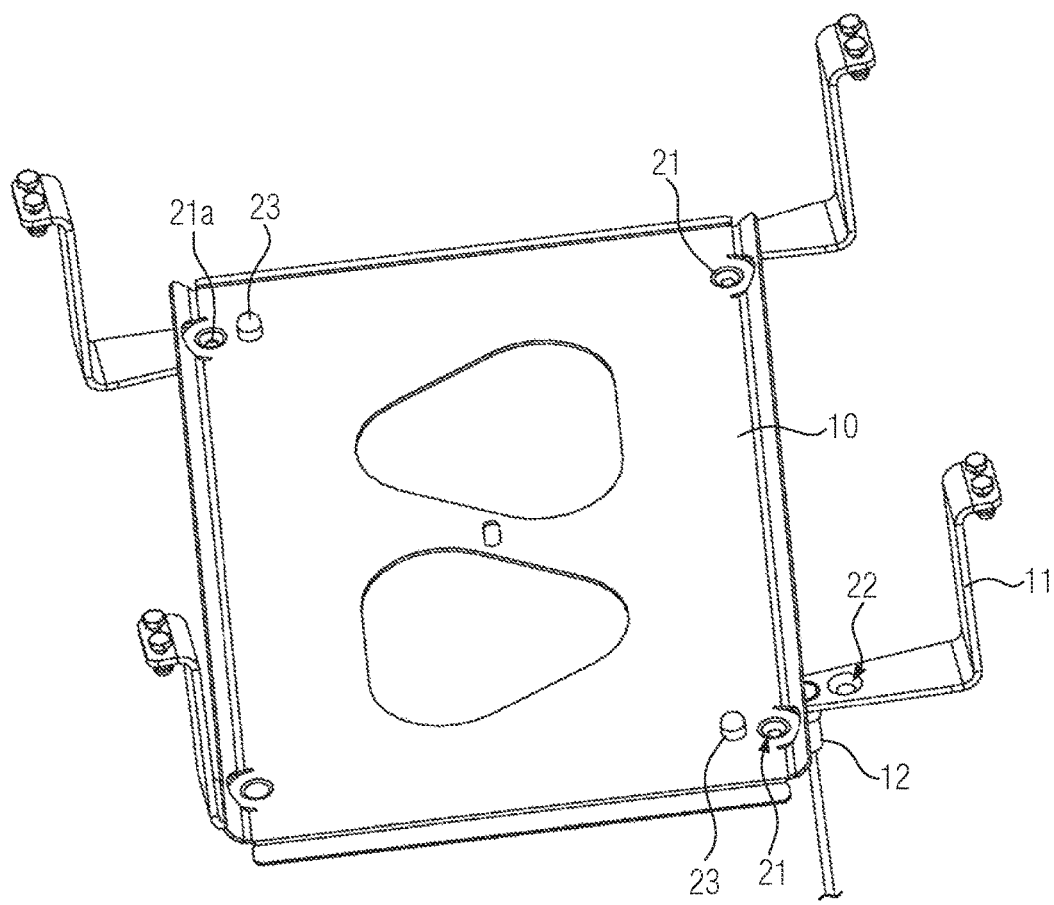
FIG. 4 is a top perspective view of the trigger plate of FIG. 3 showing intake holders in a trigger position in accordance with the teachings of the present disclosure.

FIG. 4 shows a position of the trigger plate 10 that is deflected in relation to the production position shown in FIG. 3 and in which said trigger plate was moved in a clockwise direction in such a way that only the rear left recess 21a is still lying in the trough 22 of the associated intake holder 11 and that the sensor 12 that is located there records the magnet 23 and does not send an error signal to the control 13. The other three recesses 21 have been moved out of and away from the troughs 22 of the other three intake holders 11. The sensor 12 shown at the front right in this FIG. 4 does no longer record the assigned magnet 23 and sends an error signal to the control 13, which, in turn, triggers an immediate stop of the second motor 15 of the transport device 2.

Figure 5:
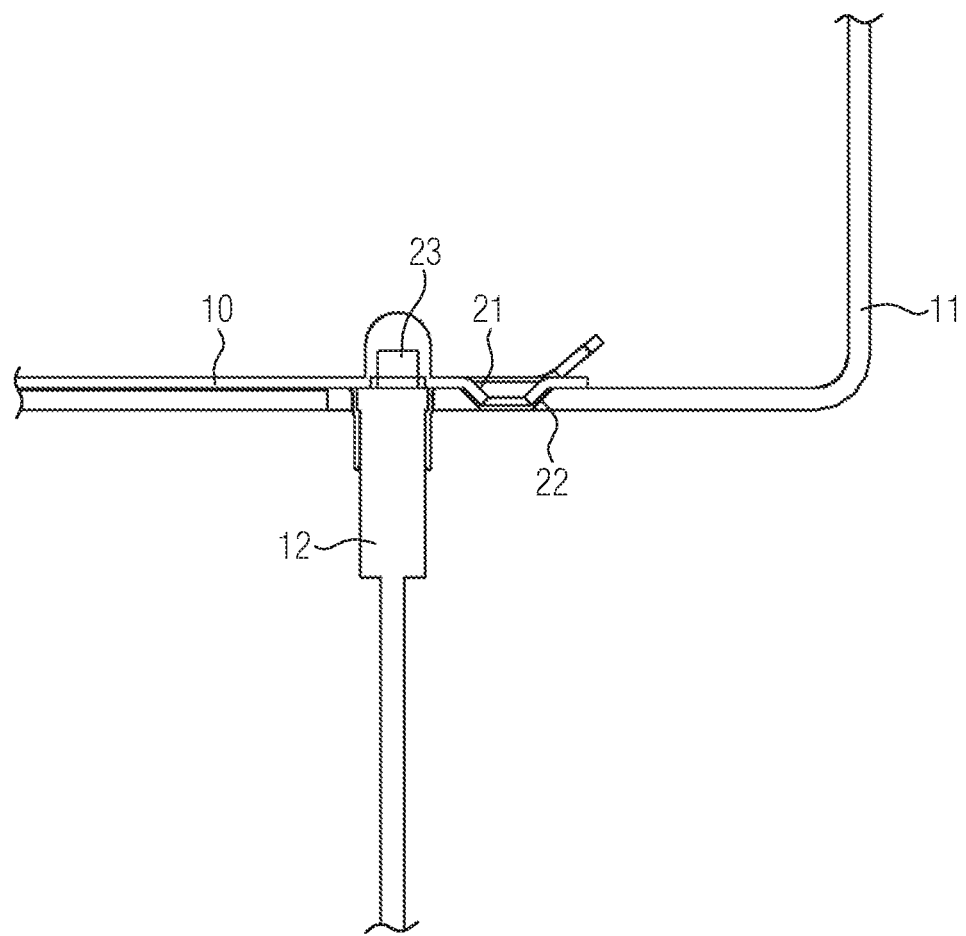
FIG. 5 is a section view of one embodiment of a trigger plate and an intake holder in accordance with the teachings of the present disclosure.

FIG. 5 shows a section view of the trigger plate 10 and of an intake holder 11 that also comprises a sensor 12. The recess 21 and the trough 22 have a form that is congruent to one another, i.e. the recess 21 is centered in the trough 22 in such a way that the production position of the trigger plate 10 is defined. In this context, the magnet 23, which is installed firmly on the trigger plate 10, is located directly above the sensor 12.

Already in case of a horizontal and/or upward-acting force impact of just a few Newton (smaller than 150N), the trigger plate 10 can be moved out of the trough 22 and subsequently away from it.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention.

As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A screw denester for isolated dispensing of trays, the screw denester comprising:
   a frame for supporting the screw denester in a position relative to a transport device for the trays; and
   a plurality of force-driven dispensing screws for isolating and dropping of trays;
   a trigger plate that is arranged loosely on the frame below the dispensing screws; and
   at least one sensor that records a position change of the trigger plate in relation to the frame.

2. The screw denester according to claim 1, wherein the trigger plate has at least one opening for a tray.

3. The screw denester according to claim 1, wherein a first distance of the trigger plate to the bottom side of the plurality of force-driven dispensing screws amounts to less than 10 mm.

4. The screw denester according to claim 1, wherein the trigger plate further comprises positioning elements that interact with the frame.

5. The screw denester according to claim 1, further comprising a plurality of intake holders to operably connect the trigger plate to the frame, wherein the trigger plate comprises one or more recesses and the plurality of intake holders include one or more troughs, wherein the one or more recesses and the one or more troughs have a form that is at least substantially congruent in relation to one another.

6. The screw denester according to claim 1, further comprising at least two sensors for detecting a position change of the trigger plate in relation to the frame.

7. The screw denester according to claim 6, wherein the at least two sensors are disposed in corner areas of the trigger plate in a position diagonally opposite to one another.

8. The screw denester according to claim 7, wherein the at least two sensors are one of a magnet sensor, a light barrier, a capacitive sensor, or an inductive sensor.

9. A combination of a screw denester according to claim 1 with a transport device for trays.

10. The combination according to claim 9, wherein a distance of the trigger plate to a transport bracket of the transport device is vertically adjustable.

11. The combination according to claim 10, wherein the distance can be set using a position of the frame in relation to a position of the transport device.

12. A combination of a screw denester according to claim 6 with a transport device for trays, wherein the at least two sensors are in electronic communication with a control for a drive of the transport device.

* * * * *